United States Patent
Kudo

(10) Patent No.: US 7,068,154 B2
(45) Date of Patent: Jun. 27, 2006

(54) STOP MARKER RECOGNITION APPARATUS OF VEHICLE DRIVE ASSIST SYSTEM

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 609 days.

(21) Appl. No.: 10/236,698

(22) Filed: Sep. 5, 2002

(65) Prior Publication Data

US 2003/0043030 A1 Mar. 6, 2003

(30) Foreign Application Priority Data

Sep. 6, 2001 (JP) .................................. 2001-270802

(51) Int. Cl.
*B60Q 1/00* (2006.01)

(52) U.S. Cl. .................. 340/436; 340/435; 382/104; 348/148; 348/149; 342/70

(58) Field of Classification Search ................ 340/436, 340/435, 903, 904, 928, 575, 576; 382/103, 382/104, 154, 106, 270, 190, 224, 181; 348/148, 348/149, 135; 180/271; 342/70, 71, 72
See application file for complete search history.

(56) References Cited

U.S. PATENT DOCUMENTS 5,412,487 A * 5/1995 Nishimura et al. ......... 358/452

6,226,592 B1 * 5/2001 Luckscheiter et al. ...... 701/301
6,335,689 B1 * 1/2002 Mine .......................... 340/576
6,385,536 B1 * 5/2002 Kimura ....................... 701/209

FOREIGN PATENT DOCUMENTS

| JP | 05-289743 | 11/1993 |
| JP | 09-190537 | 7/1997 |
| JP | 2000-118261 | 4/2000 |

\* cited by examiner

*Primary Examiner*—Daniel Wu
*Assistant Examiner*—Tai T. Nguyen
(74) *Attorney, Agent, or Firm*—Darby & Darby

(57) ABSTRACT

A particular area extending in a widthwise direction of a vehicle is established in a lower part of a picture image taken by CCD cameras and the area is divided into six small areas. It is judged that a stop marker exists when an average brightness of respective three successive small areas of the six small areas rises from a low level to a high level and then descends from the high level. As a result of recognition of a stop marker, in case where a stop marker exists and there is a solid object immediately ahead of the stop marker, a drive assist system gives a warning to a vehicle operator or a congestion follow-up mode is turned off. Further, in case where a stop marker exists and there is a solid object immediately ahead of the stop marker, while the vehicle is in a standstill, the drive assist system prohibits the vehicle operator from starting the vehicle.

23 Claims, 9 Drawing Sheets

STOP MARKER RECOGNITION APPARATUS OF VEHICLE DRIVE ASSIST SYSTEM

BACKGROUND OF THE INVENTION

1. Field of the Invention

The present invention relates to a stop marker recognition apparatus of a vehicle drive assist system for recognizing a stop marker ahead of a vehicle.

2. Discussion of Prior Art

In recent years, the conception of an Intelligent Transport System (ITS) has been introduced to technologies for developing vehicles. For example, Japanese Patent Application Laid-open No. Toku-Kai 2000-118261 discloses a technology in which an own vehicle automatically follows up a preceding vehicle in a traffic jam, particularly in a stop-and-go traffic condition by electronically controlling a throttle valve and a brake system according to signals of an intervehicle distance detecting sensor.

However, this technology has a problem when the own vehicle enters an intersection. In case where the preceding vehicle stops across the intersection, the own vehicle must stop at a stop marker before the intersection. Since prior technologies have no function to detect the stop marker and to inform a vehicle operator, the own vehicle can not stop at the stop marker. Japanese Patent Applications Laid-open No. Toku-Kai-Hei 9-190537, No. Toku-Kai-Hei 5-289743 and many other technologies propose apparatuses for recognizing white markers on roads, however any of these technologies detect only lane markers and can not detect stop markers lying on roads in a widthwise direction of the vehicle.

SUMMARY OF THE INVENTION

It is an object of the present invention to provide a stop marker recognition apparatus capable of securely recognizing a stop marker extending on a road in a widthwise direction of the vehicle and it is another object of the present invention to provide a vehicle drive assist system capable of properly controlling the entrance into an intersection of the own vehicle according to a result of the recognition of the stop marker by the stop marker recognition apparatus.

To attain the objects of the present invention, a particular area extending in a widthwise direction of a vehicle is established in a lower part of an image picture taken by CCD cameras and the area is divided into six small areas. It is judged that a stop marker exists when an average brightness of respective three successive small areas of the six small areas rises from a low level to a high level and then descends from the high level. As a result of recognition of a stop marker, in case where a stop marker exists and there is a solid object immediately ahead of the stop marker, a drive assist system gives a warning to a vehicle operator or a congestion follow-up mode is turned off. Further, in case where a stop marker exists and there is a solid object immediately ahead of the stop marker, while the vehicle is in a standstill, the drive assist system prohibits the vehicle operator from starting the vehicle.

DETAILED DESCRIPTION OF THE PREFERRED EMBODIMENTS

Figure 1:
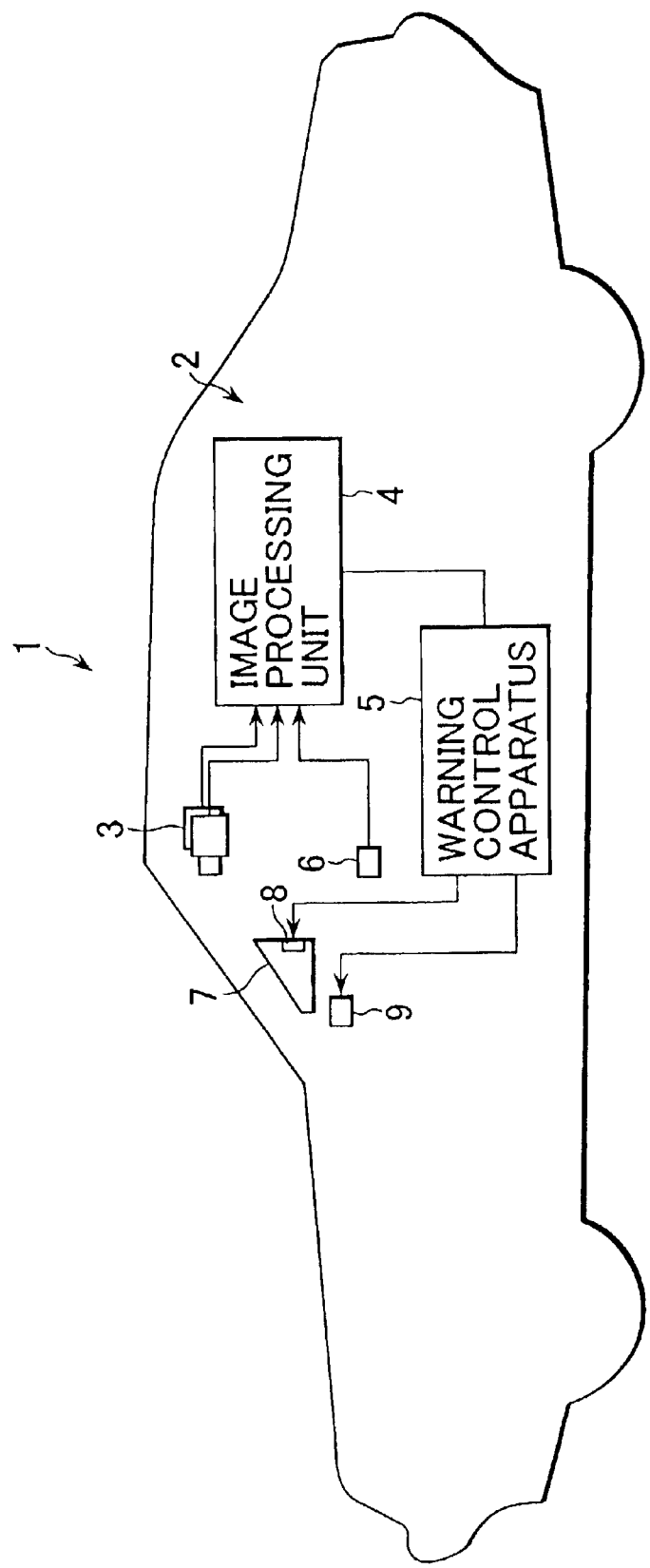
FIG. 1 is a schematic view showing a vehicle drive assist system installed on a vehicle according to a first embodiment of the present invention.

Referring now to FIG. 1, reference numeral 1 denotes a vehicle (own vehicle) and reference numeral 2 denotes a vehicle drive assist system mounted on the vehicle 1. The vehicle drive assist system 2 is constituted by a stereoscopic optical system 3, an image picture processing unit 4 and a warning control apparatus 5.

The stereoscopic optical system 3 comprises a pair of left and right CCD cameras for taking image pictures of surrounding sceneries of the vehicle and is connected with an image processing unit 4 in which the configuration of roads and solid objects in front of the vehicle and the position thereof are calculated based on image information obtained from the stereoscopic optical system 3.

Specifically, the three-dimensional distance distribution is calculated over the entire image picture by processing a pair of left and right stereoscopic images taken by the CCD cameras of the stereoscopic optical system 3 and the configuration of a road or the three-dimensional position of solid objects are detected based on the distance distribution information at high speeds.

Further, on detecting the configuration of the road, first only white markers on an actual road are extracted from the distance image using the positional information of three-dimension and the configuration of the road is recognized by correcting or modifying parameters of built-in road models so as to agree with the configuration of the actual road based on the extracted white markers.

Further, on detecting the objects, based on thus detected configuration of the road, the data of a solid object is extracted from the distance image by selecting the data existing above the road surface from the distance image and by deleting noises contained in the distance image. Further, the distance image is divided into a plurality of latticed blocks at a specified interval and one histogram is established for each block. The distance to the solid object is calculated from the histogram. An outline of the object is extracted based on the distance data of the object in respective blocks and the kind of the object is identified based on the configuration, size and position of the object. Thus, in case where a vehicle traveling immediately before the own vehicle (hereinafter referred to as a preceding vehicle) is identified, a vehicle speed of the own vehicle and a vehicle speed of the preceding vehicle are calculated from a vehicle speed sensor 6 and data of a distance between the own vehicle and the preceding vehicle (hereinafter referred to as an intervehicle distance). Hence, the image processing unit 4 has a function of an solid object recognition means for recognizing a solid object. Further, the image processing unit 4 also has a function of a stop marker recognition apparatus for recognizing a stop marker on a road according to a stop marker judging routine which will be described hereinafter.

That is, the image processing unit 4 comprises an area brightness detecting means for establishing a particular area in which a stop marker is searched on an original image picture and for detecting a brightness of the area, a brightness change comparison means for comparing the change of time-versus brightness and a stop marker judging means for recognizing a stop marker based on this brightness change.

Figure 2:
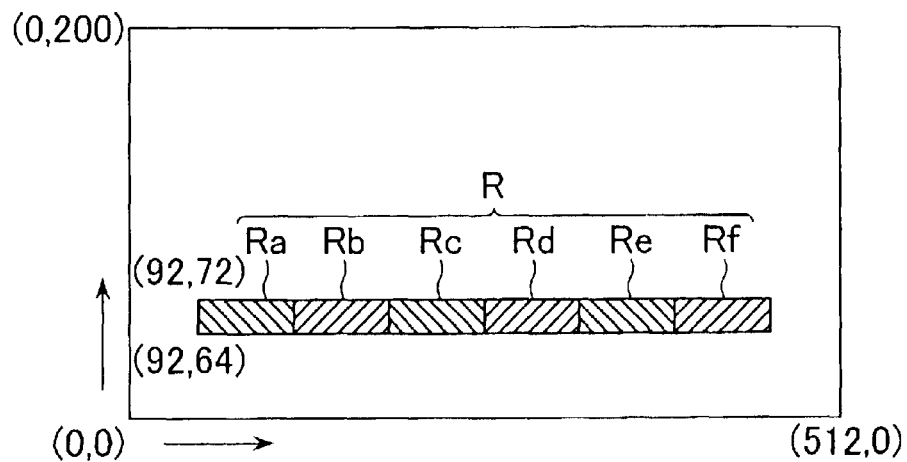
FIG. 2 is an explanatory view showing evaluation areas on an image picture for recognizing a stop marker.

The original image inputted from the CCD cameras is composed of 512 pixels horizontally and 200 pixels vertically as shown in FIG. 2. An area R is established on the rather lower side of the image picture in a widthwise direction of the vehicle, comprising 6 small areas Ra, Rb, Rc, Rd, Re and Rf successively connected in a widthwise direction of the own vehicle, each of which is composed of 65 pixels horizontally and 9 pixels vertically.

Figure 3:
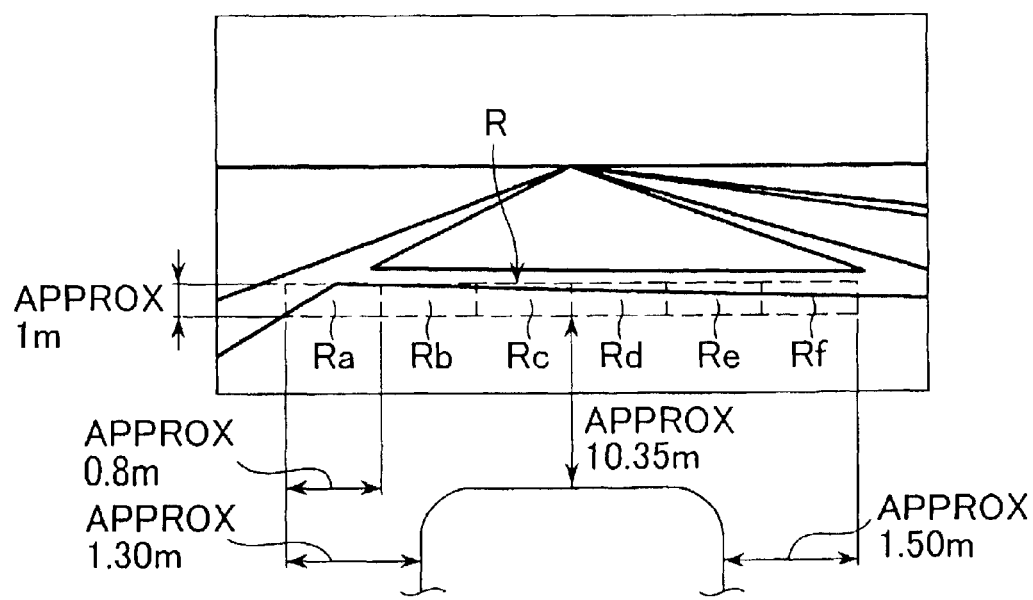
FIG. 3 is an explanatory view showing a two-dimensional position of evaluation areas on the basis of a position of an own vehicle.

With respect to the actual two-dimensional position of the area R, as shown in FIG. 3, the area R lies 10.35 meters ahead of the own vehicle 1, extending from the own vehicle 1 by approximate 1.5 meters to the right and extending from the own vehicle by approximate 1.3 meters to the left. Further, the horizontal length of the small areas Ra, Rb, Rc, Rd, Re and Rf is equivalent to approximate 0.8 meters and the vertical length thereof is equivalent to approximate 1.0 meter.

An average brightness of three adjacent small areas, Ra, Rb, Rc and Rb, Rc, Rd and Rc, Rd, Re and Rd, Re, Rf is calculated respectively. If the average brightness of a group of the small areas is larger than a threshold value and the average brightness of adjacent groups is smaller than the threshold value, it judged that there is a stop marker in the area R. In this case, such a condition that when all of six small areas concurrently have brightness changes there is a stop marker, is insufficient. This is because there is a possibility that only a long stop marker can be detected and a short stop marker can not be found. Also, there is a possibility that if the own vehicle 1 enters the stop marker diagonally, either of both ends of the small areas comes out of the stop marker.

Further, the above threshold value is designed to be variable according to the traveling environment. For example, the threshold value is established to a comparatively large value in the sunshine and the threshold value is established to a small value in the shade. Further, the threshold value is established to a large value in the knighting driving.

The warning control apparatus 5 inputs information about the road configuration, solid objects and the recognized stop marker and when an solid object such as a preceding vehicle is recognized just in front of the stop marker raises an alarm through a warning lamp 8 or a warning buzzer 9 built in a combination meter 7. The warning control apparatus 5 acts as a warning control means of the vehicle drive assist system 2.

Figure 4:
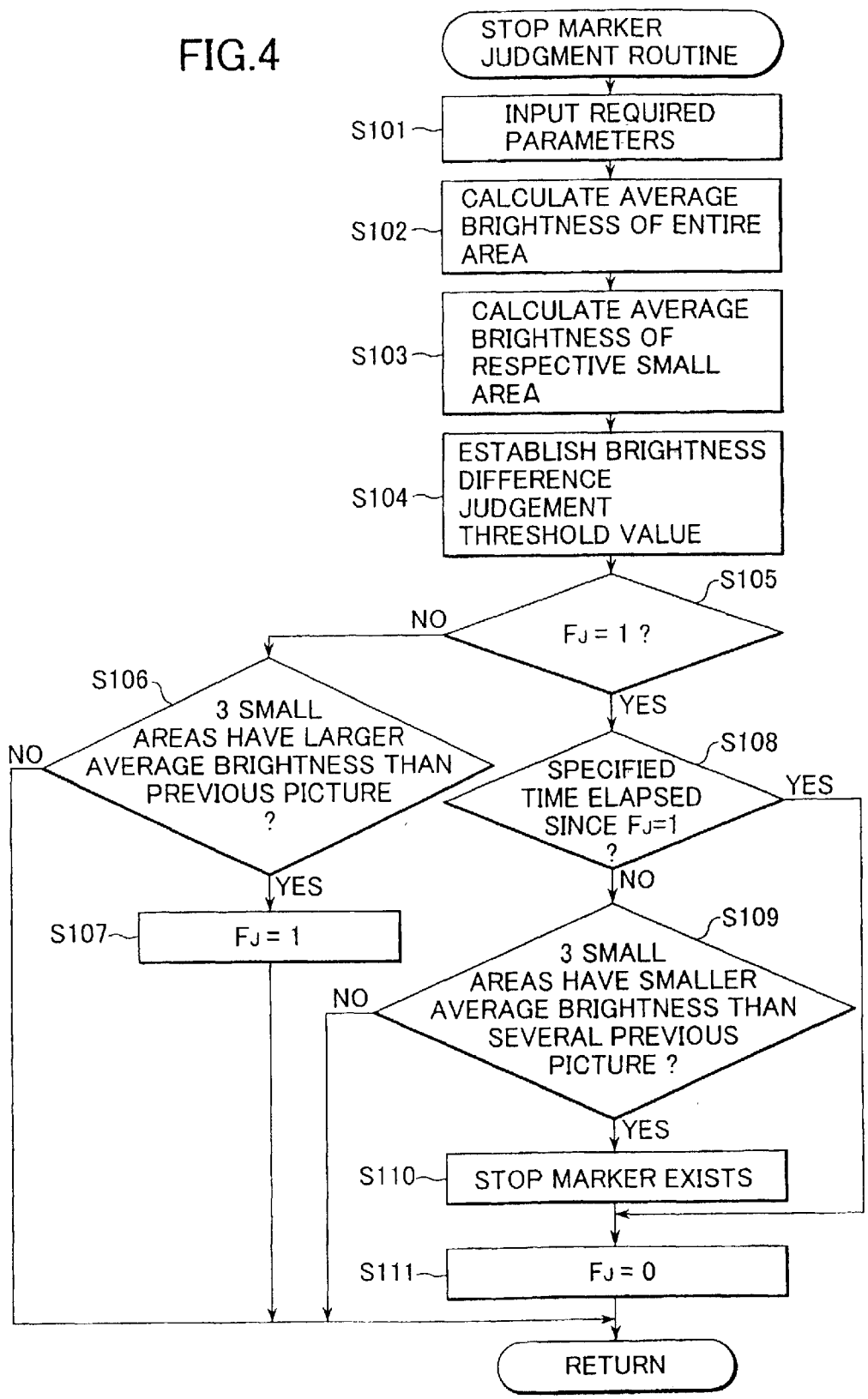
FIG. 4 is a flowchart of a stop marker judgment routine.

Next, a stop marker judging routine executed in the image processing unit 4 will be described by reference to a flowchart of FIG. 4. This routine is executed every a specified time (for example 20 milliseconds). First, at a step (hereinafter referred to as "S") 101, required parameters such as brightness information of the area R and the like are inputted. Then, the program goes to S102 where an average brightness of the whole area R is calculated and at a next step S103 an average brightness of respective six small areas Ra, Rb, Rc, Rd, Re and Rf is calculated.

Next, the program goes to S104 where threshold values for the brightness difference judgment are established based on the running circumstance. As described above, in the sunshine where the average brightness of the entire area R for recognizing stop markers is high, the threshold value is established to a relatively large value. Further, in the shade where the average brightness of the entire area R is low and the head light is turned off, the threshold value is established to a small value. On the other hand, in the night and when the head light is turned on, the threshold value is established to a large value.

Then, the program goes to S105 in which it is judged whether a flag Fj for judging average brightness condition is 1 or 0. This average brightness condition judging flag Fj is set (Fj=1) in case where any of the average brightness of the groups of three adjacent small areas Ra, Rb, Rc and Rb, Rc, Rd and Rc, Rd, Re and Rd, Re, Rf becomes higher than that of a previous picture and the average brightness exceeds the brightness difference judging threshold value.

As a result of the judgment at S105, Fj=1, that is, in case where there is no group having a higher average brightness than that of the previous picture, the program goes to S106 where it is judged whether or not there is a group having a higher average brightness than that of the previous picture.

As a result of the judgment at S106, in case where there is no group having a higher average brightness than that of the previous picture, the program leaves the routine. Further, in case where there is a group of three adjacent small areas having a higher average brightness than that of the previous picture and the average brightness of the group of three adjacent small areas exceeds the threshold value established at S104, the program goes to S107 where the average brightness condition judging flag Fj is set (Fj=1) and leaves the routine.

On the other hand, in case where at S105 the average brightness condition judging flag Fj is set (Fj=1), that is, in case where at least one average brightness of the groups of three adjacent small areas becomes higher than that of the previous picture, the program goes to S108.

At S108, it is judged whether or not a specified time elapses since Fj=1. In case where the specified time has elapsed, it is judged that the average brightness condition judging flag Fj is set to 1 in a previous routine because of errors or other reasons but because of the stop marker and the program skips to S111. In which the average brightness condition judging flag Fj is cleared (Fj=0) and the program leaves the routine.

Inversely, in case where a specified time has not yet elapsed since Fj=1, the program goes to S109 where it is judged whether or not the group whose average brightness has become higher than that of a previous picture has a smaller average brightness than that of a several previous picture.

Then, as a result of the judgment at S109, if the group whose average brightness has become higher than that of the previous picture has an average brightness not smaller than that of the several previous picture, the flow of control leaves the routine. Further, if the group has an average brightness smaller than that of the several previous picture, the program goes to S110 where it is judged that there is a stop marker. After that, at the next step S111 the average brightness condition judging flag Fj is cleared (Fj=0) and the program leaves the routine.

Figure 5:
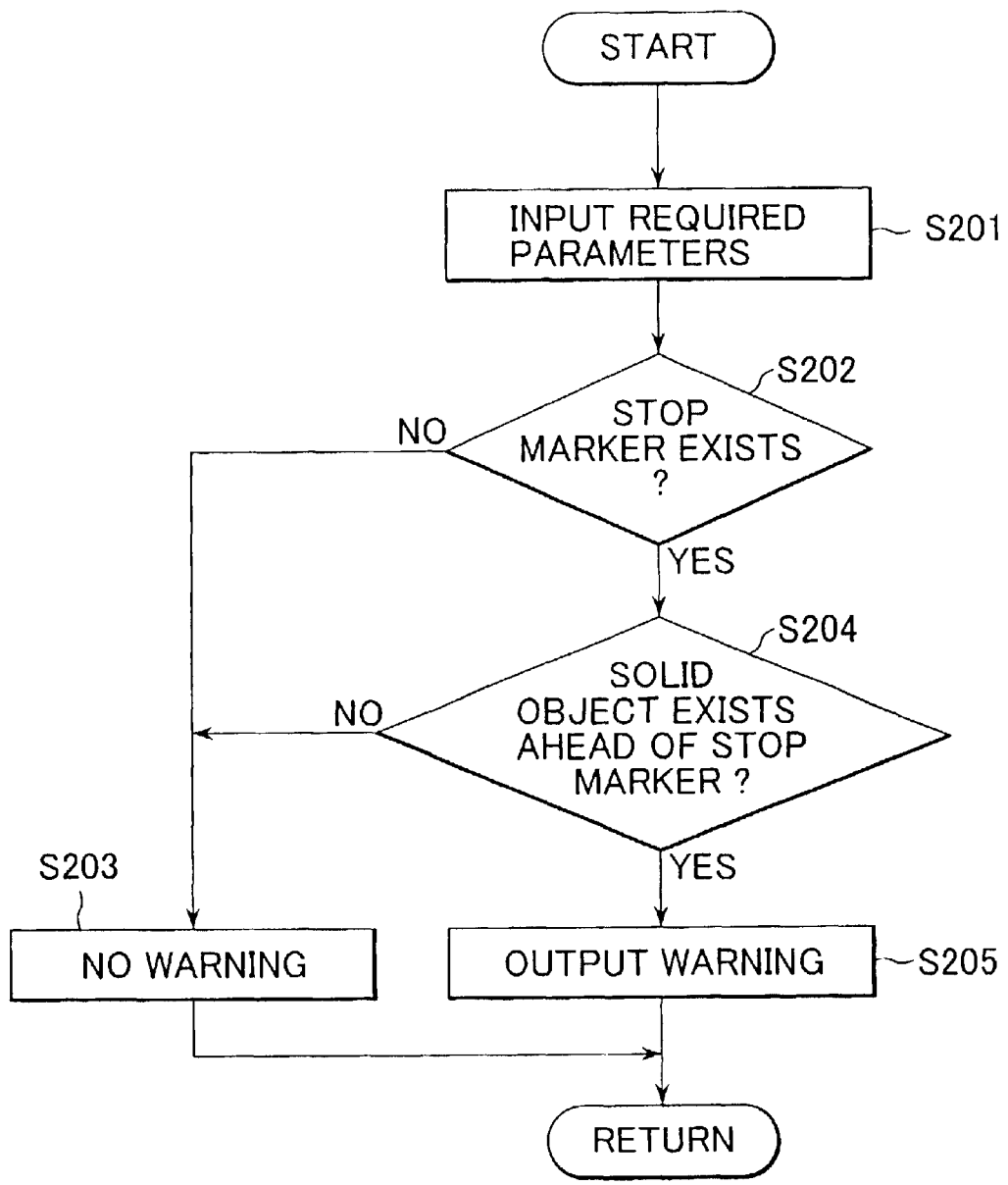
FIG. 5 is a flowchart of a stop marker warning control.

Next, a stop marker warning control executed in the warning control apparatus 5 will be described by reference to a flowchart of FIG. 5. The program shown in FIG. 5 is executed every a specified time for example 20 milliseconds. First, at S201, required parameters such as information of frontal road configurations, solid objects and stop markers are inputted from the image processing unit 4 to the warning control apparatus 5.

The program goes to S202 where it is judged whether or not s stop marker exists. If no stop marker exists, the program goes to S203 where it is judged that no alarm is raised and leaves the routine. On the other hand, if a stop marker exists, the program goes to S204 where it is judged whether or not a solid object (preceding vehicle and the like) exists immediately in front of the stop marker.

As a result of the judgment of S204, if no solid object exists immediately in front of the stop marker, the program goes to S203 where it is judged that no alarm is issued and leaves the routine. If a solid object exists immediately in front of the stop marker, the program goes to S205 where an alarm is raised through a warning lamp 8 or a warning buzzer 9.

Thus, according to the first embodiment of the present invention, the image processing unit 4 surely recognizes a stop marker drawn in the transverse direction of a vehicle on a traveling road. Further, based on the result of recognition of a stop marker, the warning control apparatus 5 gives a vehicle operator a warning so as to stop before the stop marker in case where a preceding vehicle or other solid objects exist when the vehicle enters an intersection. In many cases, roads have a pedestrian crossing in front of a stop marker. This apparatus effectively prevents a vehicle from entering a pedestrian crossing.

Next, a second embodiment of the present invention will be described by referring to FIG. 6 and FIG. 7.

Figure 6:
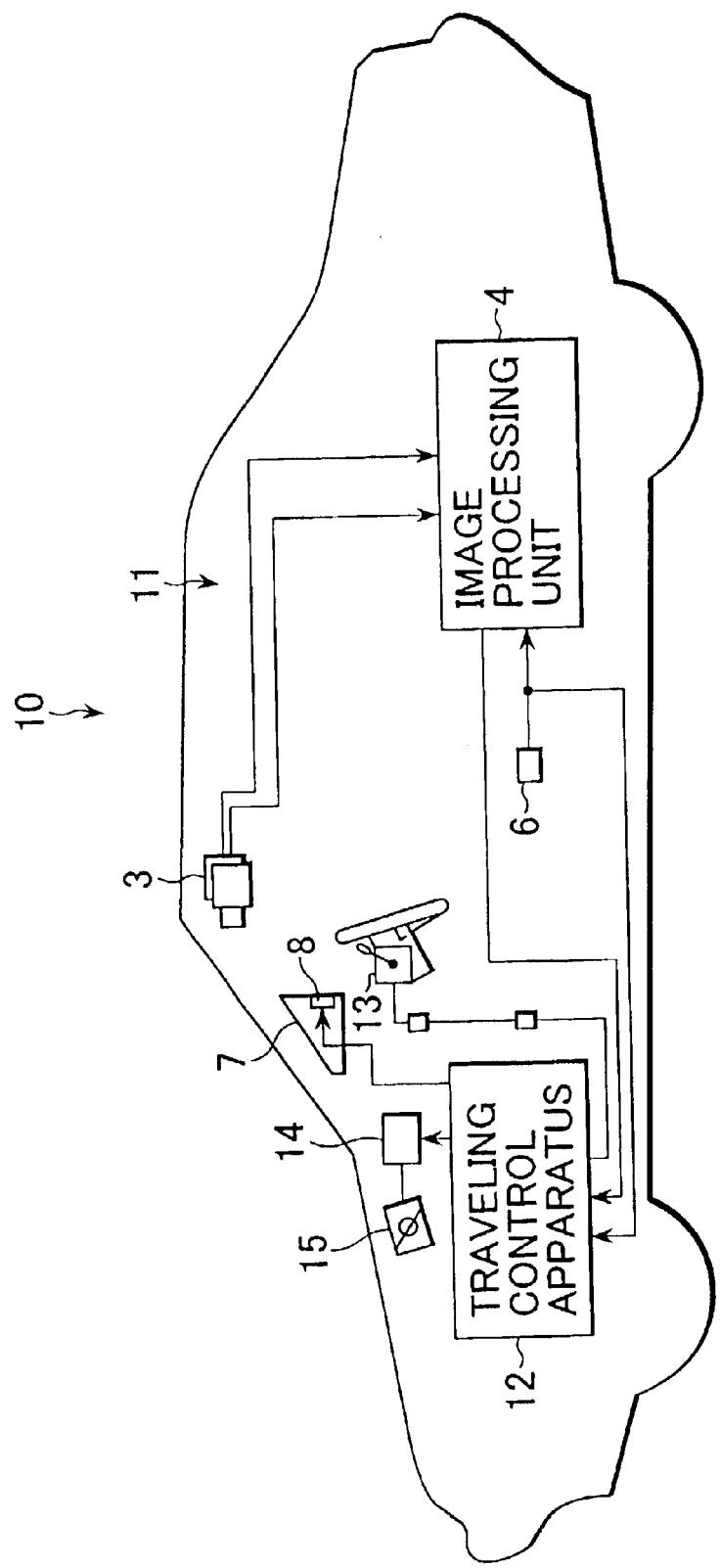
FIG. 6 is a schematic view showing a vehicle drive assist system installed on a vehicle according to a second embodiment of the present invention.

Referring to FIG. 6, reference numeral 10 denotes a vehicle (own vehicle) and reference numeral 11 denotes a vehicle drive assist system primarily composed of a stereoscopic optical system 3, an image processing unit 4 and a traveling control apparatus 12.

The traveling control apparatus 12 enters into a known congestion follow-up mode by turning a manual switch 13 on. Describing the function of the congestion follow-up mode specifically, in a traffic jam, when an intervehicle distance between the own vehicle 10 and a preceding vehicle exceeds a predetermined value (for example 6 to 8 meters), the own vehicle 10 catches up with the preceding vehicle by actuating a throttle actuator 14 of the own vehicle 10, automatically opening a throttle valve 15, and controlling the vehicle speed below 30 to 40 kilometers/hour while the brake is exerted. As a result, the intervehicle distance between the own vehicle and the preceding vehicle is kept constant. When the preceding vehicle stops, the own vehicle 10 also stops with a safe intervehicle distance secured. When the own vehicle 10 is in a congestion follow-up mode, the warning lamp 8 in the combination meter 7 is lighted.

When a signal indicating that a stop marker exists ahead is inputted from the image processing unit 4 to the traveling control apparatus 12, the congestion follow-up mode described above is automatically turned off so that the own vehicle is prevented from following up a preceding vehicle deeply into pedestrian crossings or intersections. The traveling control apparatus 12 has a function as a follow-up running means in the vehicle drive assist system 11.

Figure 7:
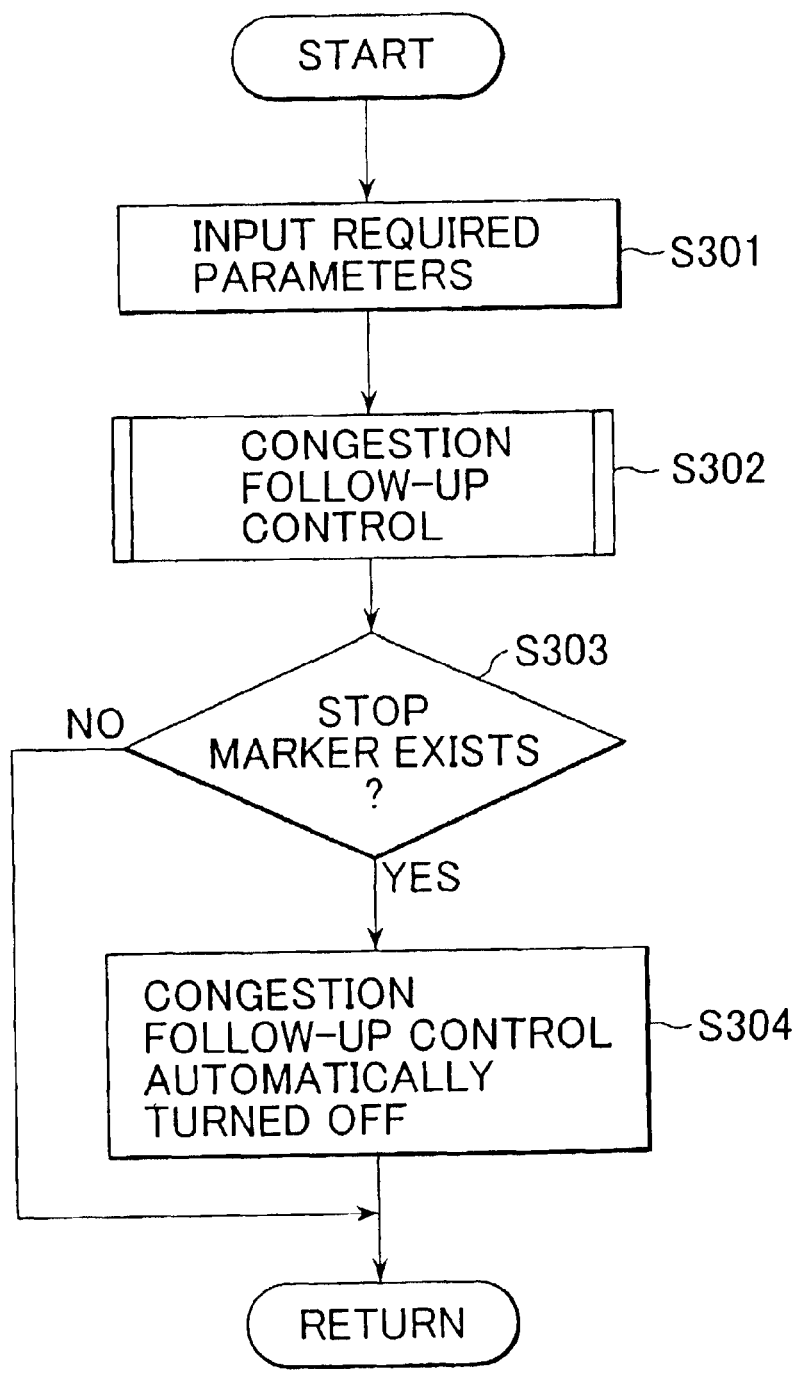
FIG. 7 is a flowchart of a preceding vehicle follow-up control according to a second embodiment.

FIG. 7 is a flowchart of a congestion follow-up control and this routine is executed every specified time, for example 50 milliseconds. First, at S301 required parameters such as road configurations, information of the preceding vehicle or miscellaneous objects, information of stop markers and the like, are inputted from the image processing unit 4.

Next, the program goes to S302 where the congestion follow-up control is executed. As described before, in the congestion follow-up control, the distance to the preceding vehicle is kept constant.

Next, the program goes to S303 where it is judged whether or not a stop marker exists. In case where a stop marker does not exist, the program returns to START and the congestion follow-up control is performed. In case where a stop marker exists, the program goes to S304 where the congestion follow-up mode is automatically turned off and leaves the routine.

Thus, according to the second embodiment of the present invention, when a signal indicating that a stop marker exists ahead is inputted to the traveling control apparatus 12, the congestion follow-up mode is automatically turned off and the own vehicle is effectively prevented from following up the preceding vehicle over the stop marker, for example, into the pedestrian crossing or into the intersection.

Figure 8:
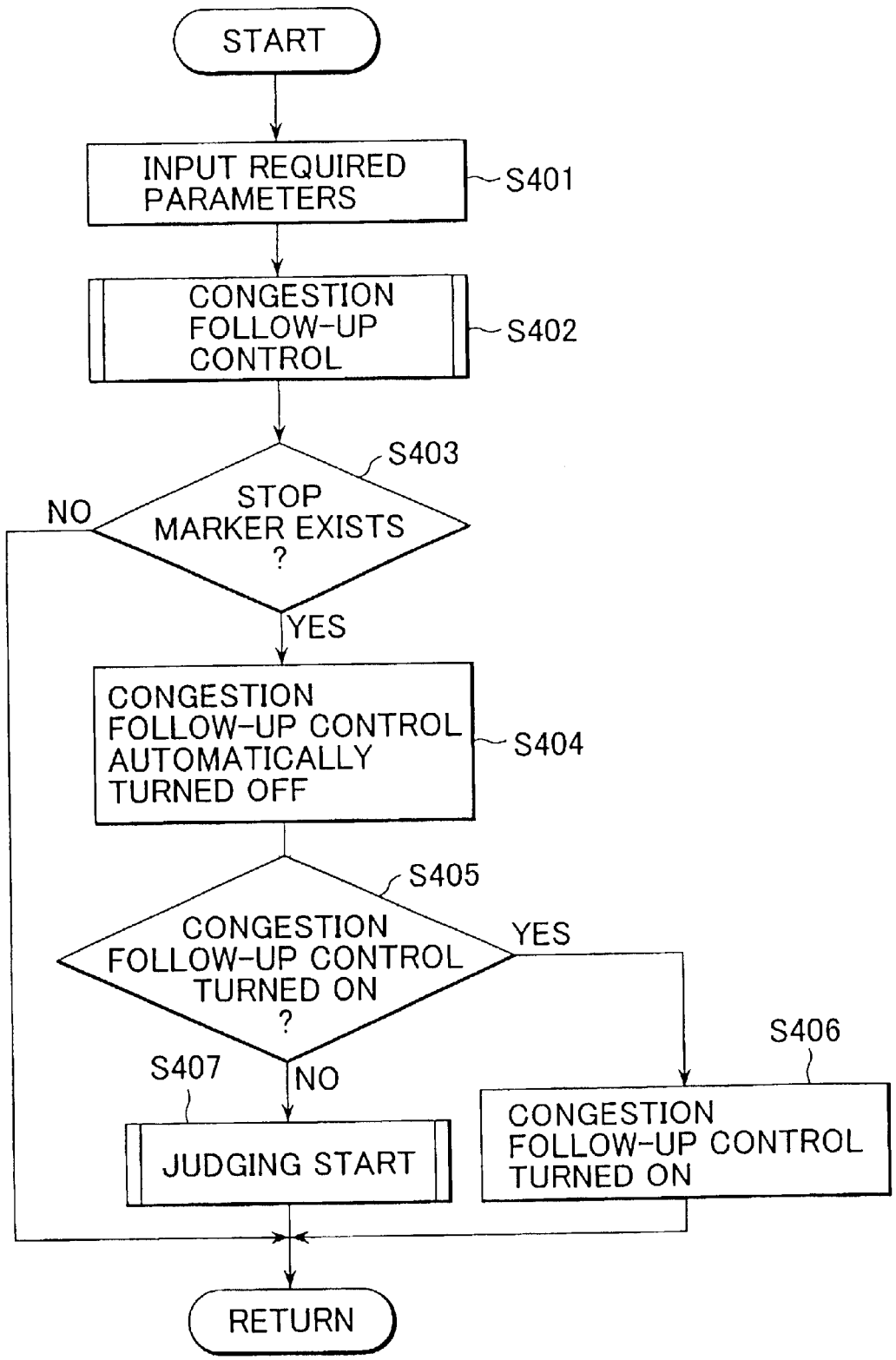
FIG. 8 is a flowchart of a flowchart of a preceding vehicle follow-up control according to a third embodiment.
Figure 9:
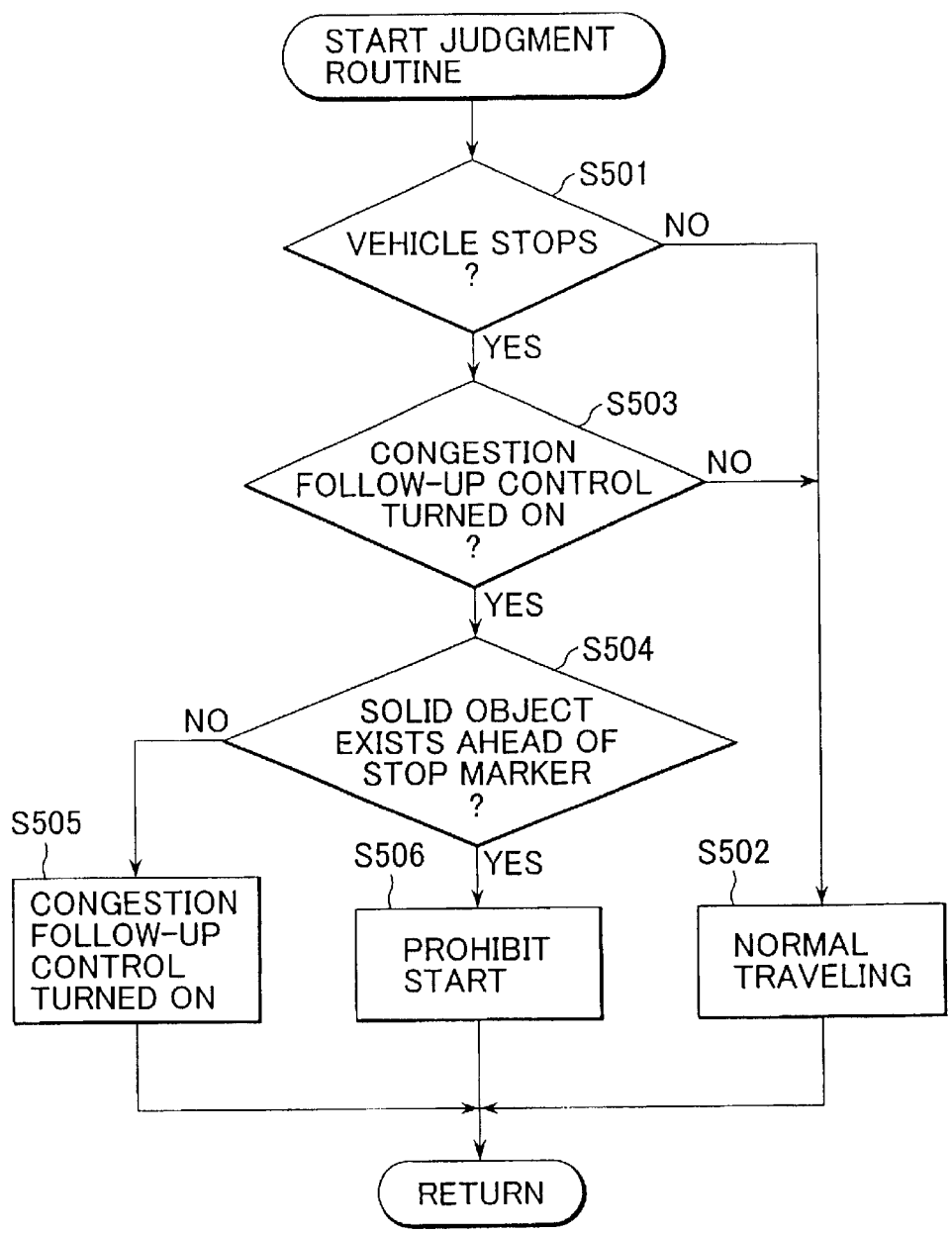
FIG. 9 is a flowchart of a start judgment routine according to a third embodiment.

FIG. 8 is a flowchart of a congestion follow-up control according to the third embodiment and FIG. 9 is a flowchart of a start judging routine according to the third embodiment. The feature of the third embodiment is that the congestion follow-up control of the second embodiment is modified depending on the judgment whether a solid object exists or not ahead of the stop marker.

The program shown in FIG. 8 is executed every a specified time (for example 50 milliseconds). First, at S401 required parameters such as frontal road configurations, information of a preceding vehicle, information of other solid objects, are inputted from the image processing unit 4.

Next, the program goes to S402 where the congestion follow-up control described above is carried out.

Next, the program goes to S403 where it is judged whether or not a stop marker exists in front of the own vehicle. If there is no stop marker, the program leaves the routine and the congestion follow-up control is performed. If there is a stop marker, the program goes to S404 where the congestion follow-up mode is automatically turned off.

After that, the program goes to S405 where it is judged whether or not the congestion follow-up mode is manually turned on again. If the switching-on operation of the congestion follow-up mode is manually done, the program goes to S406 where the congestion follow-up mode is turned on and leaves the routine. In case where the switching-on operation of the congestion follow-up mode is not manually done, the program goes to S407 where a start judgment is made in accordance with a start judgment routine which will be described hereinafter and leaves the routine.

Describing the start judgment routine executed at S407, as shown in FIG. 9, first at S501 it is judged whether or not the own vehicle comes to a standstill. In case where the vehicle does not stop, the program goes to S502 where the vehicle continues a normal running while the congestion follow-up mode is turned off and leaves the routine.

On the other hand, in case where it is judged at S501 that the vehicle comes to a standstill, the program goes to S503 where it is judged whether or not the congestion follow-up mode is manually turned on again. In case where the congestion follow-up mode is not turned on, the program goes to S502 where the normal traveling is performed while the congestion follow-up mode is turned off and leaves the routine.

Further, in case where it is judged at S503 that the congestion follow-up mode is manually turned on, the program goes to S504 where it is judged whether or not a solid object exists immediately ahead of the stop marker. In case where no stop marker exists immediately ahead of the stop marker, the program goes to S505 where the congestion follow-up mode is turned on and leaves the routine.

On the other hand, in case where it is judged at S504 that a solid object exists immediately ahead of the stop marker, since there is a possibility that the own vehicle has a collision with a preceding vehicle or a solid object ahead of the stop marker, the program goes to S506 where the own vehicle is prohibited from starting by controlling the throttle valve or brake and leaves the routine.

Thus, according to the third embodiment, even if the congestion follow-up mode is turned on while the vehicle is in a standstill, when it is judged that there is a solid object immediately ahead of the stop marker, the vehicle can be effectively prevented from entering intersections or pedestrian crossings by prohibiting the start of the vehicle.

Figure 10:
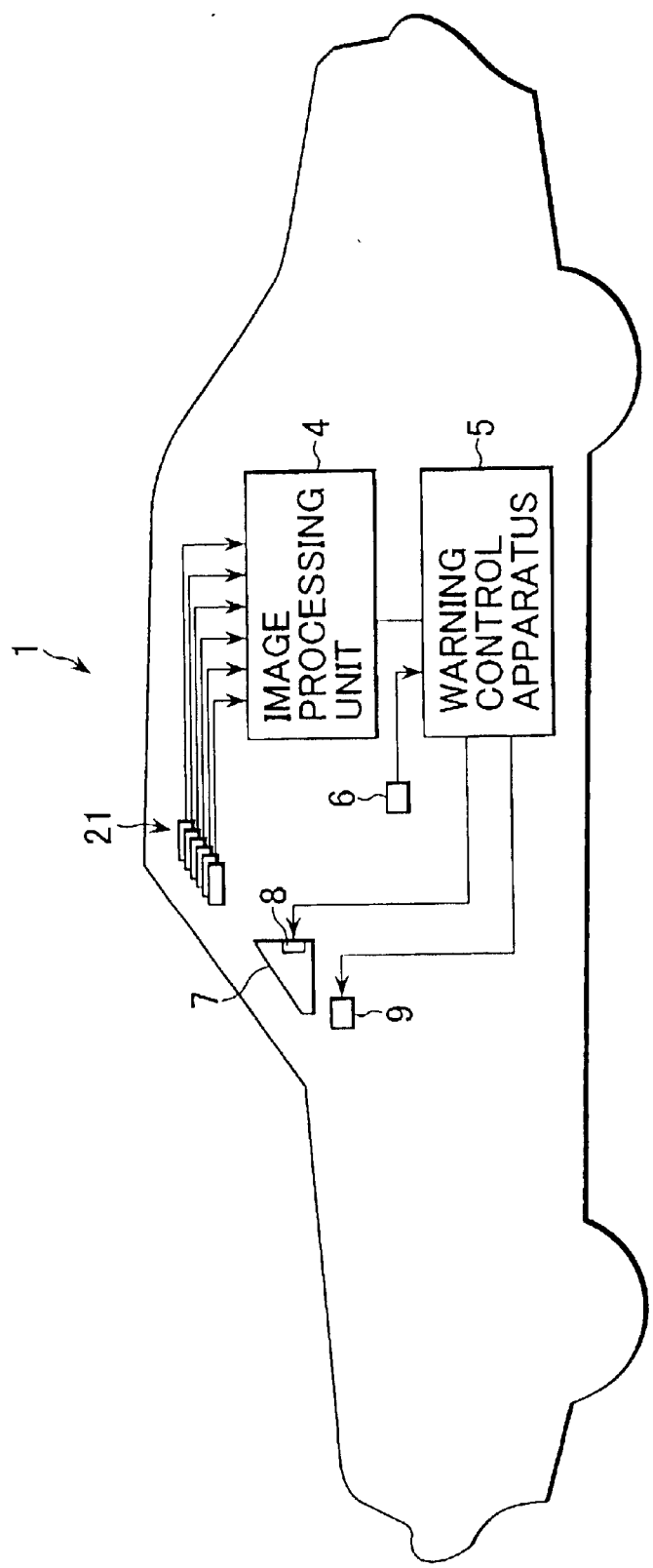
FIG. 10 is a schematic view showing a stop marker recognition apparatus according to a further embodiment.

In the respective embodiments described above, the stop marker is recognized by obtaining an average brightness of small areas of the area R, however other methods may be allowed to be adopted. For example, as shown in FIG. 10, a plurality of spot sensors 21 may be provided for respective small areas and the stop marker may be judged based on the brightness change detected by these respective spot sensors 21.

While the presently preferred embodiments of the present invention have been shown and described, it is to be understood that these disclosure are for the purpose of illustration and that various changes and modifications may be made without departing from the scope of the invention as set forth in the appended claims.

What is claimed is:

1. A drive assist system of a vehicle having a solid object recognizing means for recognizing a solid object ahead of said vehicle, comprising:
    a stop marker recognition apparatus for recognizing a stop marker ahead of said vehicle; and
    a warning control means for raising an alarm when said stop marker recognition apparatus recognizes said stop marker and when said stop marker recognition apparatus recognizes said solid object immediately ahead of said stop marker.

2. The drive assist system according to claim 1, wherein said stop marker recognition apparatus includes an area brightness detecting means for detecting a brightness of an area established ahead of said vehicle in a widthwise direction of said vehicle on a picture image, a brightness change comparing means for comparing a time-versus brightness change of said area; and a stop marker judging means for judging whether or not said stop marker exists based on said time-versus brightness change of said area.

3. The drive assist system according to claim 2, wherein said stop marker judging means is characterized in judging an existence of said stop marker when said brightness of said area rises to a level higher than a specified value and then descends.

4. The drive assist system according to claim 2, wherein said area is constituted by a plurality of small areas successively connected in a widthwise direction of said vehicle.

5. The drive assist system according to claim 2, wherein said stop marker judging means is characterized in judging whether or not said stop marker exists based on an averaged brightness change of successive several numbers of said small areas.

6. The drive assist system according to claim 2, wherein said brightness change comparing means compares said brightness change based on a threshold value variable in accordance with a running circumstance.

7. A drive assist system of a vehicle having a solid object recognizing means for recognizing a solid object ahead of said vehicle and a follow-up traveling means for following up a preceding vehicle while an intervehicle distance between said vehicle and said preceding vehicle is kept constant, comprising:
    a stop marker recognition apparatus for recognizing a stop marker ahead of said vehicle; and
    a follow-up traveling canceling means for canceling to follow up said preceding vehicle when said stop marker recognition apparatus recognizes said stop marker.

8. The drive assist system according to claim 7, wherein said stop marker recognition apparatus includes an area brightness detecting means for detecting a brightness of an area established ahead of said vehicle in a widthwise direction of said vehicle on a picture image, a brightness change comparing means for comparing a time-versus brightness change of said area; and a stop marker judging means for judging whether or not said stop marker exists based on said time-versus brightness change of said area.

9. The drive assist system according to claim 7, wherein said stop marker judging means is characterized in judging an existence of said stop marker when said brightness of said area rises to a level higher than a specified value and then descends from said level.

10. The drive assist system according to claim 8, wherein said area is constituted by a plurality of small areas successively connected in a widthwise direction of said vehicle.

11. The drive assist system according to claim 8, wherein said stop marker judging means is characterized in judging whether or not said stop marker exists based on an averaged brightness change of successive several numbers of said small areas.

12. The drive assist system according to claim 8, wherein said brightness change comparing means compares said brightness change based on a threshold value variable in accordance with a running circumstance.

13. A drive assist system of a vehicle having a solid object recognizing means for recognizing a solid object ahead of said vehicle and a follow-up traveling means for following up a preceding vehicle while an intervehicle distance between said vehicle and said preceding vehicle is kept constant, comprising:
    a stop marker recognition apparatus for recognizing a stop marker ahead of said vehicle; and
    a start prohibiting means for prohibiting said vehicle from starting when said stop marker recognition apparatus recognizes said stop marker and when said stop marker recognition apparatus recognizes said solid object immediately ahead of said stop marker while said vehicle is in a standstill.

14. The drive assist system according to claim 13, wherein said stop marker recognition apparatus includes an area brightness detecting means for detecting a brightness of an area established ahead of said vehicle in a widthwise direction of said vehicle on a picture image, a brightness change comparing means for comparing a time-versus brightness change of said area; and a stop marker judging means for judging whether or not said stop marker exists based on said time-versus brightness change of said area.

15. The drive assist system according to claim 14, wherein said stop marker judging means is characterized in judging an existence of said stop marker when said brightness of said area rises to a level higher than a specified value and then descends from said level.

16. The drive assist system according to claim 14, wherein said area is constituted by a plurality of small areas successively connected in a widthwise direction of said vehicle.

17. The drive assist system according to claim 14, wherein said stop marker judging means is characterized in judging whether or not said stop marker exists based on an averaged brightness change of successive several numbers of said small areas.

18. The drive assist system according to claim 14, wherein said brightness change comparing means compares said brightness change based on a threshold value variable in accordance with a running circumstance.

19. A drive assist system of a vehicle for recognizing a stop marker ahead of said vehicle, comprising:
- an area brightness detecting means for detecting a brightness of an area established ahead of said vehicle in a widthwise direction of said vehicle on a picture image;
- a brightness change comparing means for comparing a time-versus-brightness change of said area; and
- a stop marker judging means for judging whether or not said stop marker exists based on said time-versus-brightness change of said area.

20. The drive assist system according to claim 19, wherein said stop marker judging means judges an existence of said stop marker when said brightness of said area rises to a higher level than a specified value and then descends from said value.

21. The drive assist system according to claim 19, wherein said area is constituted by a plurality of small areas successively connected in a widthwise direction of said vehicle.

22. The drive assist system according to claim 19, wherein said stop marker judging means judges whether or not said stop marker exists based on an averaged brightness change of successive several numbers of said small areas.

23. The drive assist system according to claim 19, wherein said brightness change comparing means compares said brightness change based on a threshold value variable in accordance with a running circumference.

* * * * *